Dec. 5, 1933.  H. G. GUIRE  1,938,487

KNIFE WIPER LEVER BRACKET

Filed July 26, 1932

HENRY G. GUIRE
INVENTOR

BY Victor J. Evans & Co.
ATTORNEY

UNITED STATES PATENT OFFICE 1,938,487

KNIFE WIPER LEVER BRACKET

Henry G. Guire, Trenton, N. J.

Application July 26, 1932. Serial No. 624,818

1 Claim. (Cl. 199—62)

This invention relates to brackets for the knife wiper levers of linotype machines and it has as one of its objects the provision of a bracket constructed to have a longer life than previous brackets for the same purpose and also to afford a longer life to the lever mounted thereon and to lower the repair costs on the bracket and the lever and, further, to increase the efficiency of the linotype machine by occasioning less stoppage or partial stoppage of the same.

The bracket heretofore employed consisted of an attachable portion from which projected a bearing pin fixedly secured thereto at only one end, the other end having no bearing. The knife wiper lever was rockably mounted on said pin. Using this old style bracket, the contact roller would strike the lever off center and twist and bend the same, resulting in the stoppage of the first elevator when the latter is on its way down to the casting position. When this occurs it is difficult or impossible to eliminate the trouble without replacement of both the knife wiper bracket and the knife wiper lever. Furthermore, the lever wears out at the bearing contact very quickly. The defects mentioned are overcome by the use of my invention which provides a bracket having two supports for the bearing pin, which pin is free to rotate in the bearings or supports, and the lever is fixedly instead of loosely mounted on the pin.

The invention will be fully and comprehensively understood from a consideration of the following detailed description when read in connection with the accompanying drawing which forms part of the application with the understanding, however, that the improvement is capable of extended application and is not confined to the exact showing of the drawing nor to the precise construction described and, therefore, such changes and modifications may be made therefrom as do not affect the spirit of the invention nor exceed the scope thereof as expressed in the appended claim.

Figure 1:
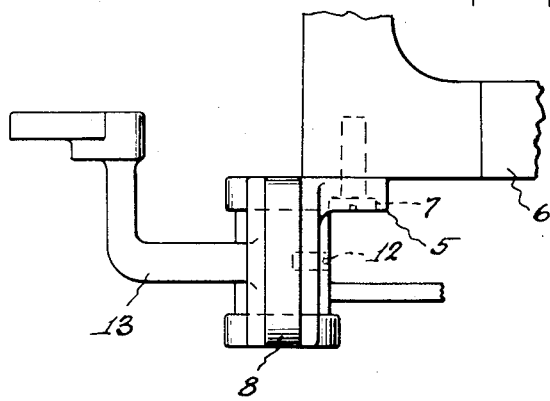
Fig. 1 is a plan view of my improved bracket and of the knife wiper lever as mounted thereon.
Figure 2:
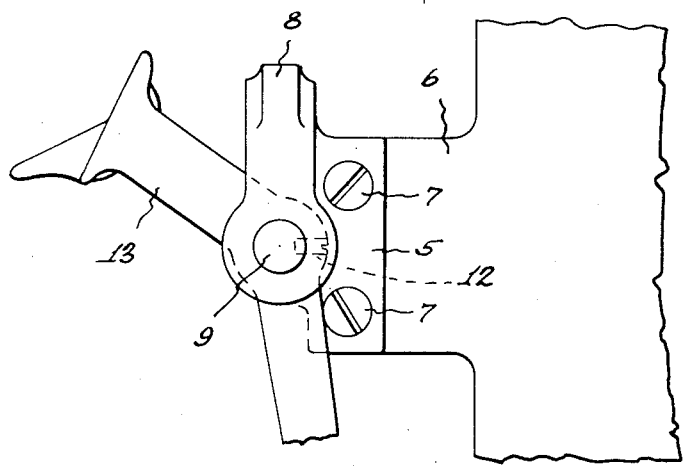
Fig. 2 is a front elevation of the structure shown in Fig. 1.
Figure 3:
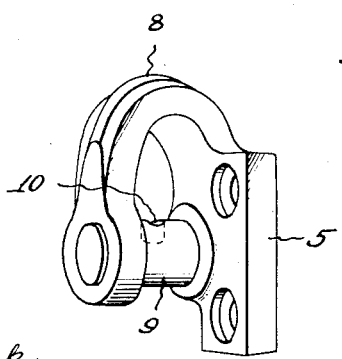
Fig. 3 is a perspective view of the new bracket.

Referring to the drawing for a more detailed description thereof, the bracket comprises a portion 5 attached to the machine part 6 by means of screws 7. Integral with the part 5 is the arched or U-shaped portion 8 in the lower ends of the arms of which are apertures provided for the reception of the end portions of the bearing pin 9 which is rotatable in its bearings and which is free to be withdrawn from the bracket. Said pin is provided with a recess 10 for the reception of the distal end portion of the set screw 12 which is employed to fixedly mount the knife wiper lever 13 on said pin.

The bracket of my invention may be used, for example, on a linotype machine of the type shown in the patent to Kennedy, No. 889,617.

What is claimed is:

In combination, a knife wiper lever of a linotype machine, a bracket including a pair of spaced bearings and a bearing pin rotatably mounted in said bearings, said knife wiper lever being mounted on said bearing pin, and means for detachably securing said lever to said pin against rotation relative thereto.

HENRY G. GUIRE.